US010009724B2

(12) United States Patent
Vaidyanathan

(10) Patent No.: US 10,009,724 B2
(45) Date of Patent: Jun. 26, 2018

(54) INTELLIGENT PERSONAL SAFETY DEVICE

(71) Applicant: Krishnamurthy Vaidyanathan, Bengaluru (IN)

(72) Inventor: Krishnamurthy Vaidyanathan, Bengaluru (IN)

(*) Notice: Subject to any disclaimer, the term of this patent is extended or adjusted under 35 U.S.C. 154(b) by 0 days. days.

(21) Appl. No.: 14/841,989

(22) Filed: Sep. 1, 2015

(65) Prior Publication Data
US 2016/0063851 A1    Mar. 3, 2016

(30) Foreign Application Priority Data
Sep. 3, 2014   (IN) .......................... 4282/CHE/2014

(51) Int. Cl.
G08B 1/08     (2006.01)
H04W 4/02    (2018.01)
H04W 4/22    (2009.01)
H04M 1/725   (2006.01)
G08B 25/00   (2006.01)
G08B 25/01   (2006.01)

(52) U.S. Cl.
CPC .......... *H04W 4/023* (2013.01); *G08B 25/009* (2013.01); *G08B 25/016* (2013.01); *H04M 1/7253* (2013.01); *H04W 4/22* (2013.01)

(58) Field of Classification Search
CPC ...... H04W 4/023; H04W 4/22; G08B 25/016; G08B 21/0446; H04M 1/7253
USPC .................................................... 340/539.13
See application file for complete search history.

(56) References Cited

U.S. PATENT DOCUMENTS

| 7,733,224 B2* | 6/2010 | Tran .................... | G08B 25/016 340/3.1 |
| 7,864,059 B2* | 1/2011 | Lee ...................... | G08B 25/016 24/68 A |
| 8,249,547 B1* | 8/2012 | Fellner ................. | G08B 25/016 455/404.1 |
| 8,957,774 B2* | 2/2015 | Goldblatt ............. | G08B 25/016 340/539.11 |
| 2015/0035676 A1* | 2/2015 | Omar ................... | G08B 25/016 340/573.1 |

* cited by examiner

Primary Examiner — John A Tweel, Jr.
(74) Attorney, Agent, or Firm — Barry Choobin; Patent 360 LLC

(57) ABSTRACT

An intelligent personal safety device is disclosed. The intelligent personal safety device is an apparatus removably coupled to a wrist watch customized to function as a personal safety device, by the way of addition of a sensor module, a processor and a communication element, in the form of an integrated circuit into the wrist watch. The integrated circuit is embedded in the strap of the wrist watch. Alternatively, the integrated circuit is embedded in the watch case of the wrist watch. Alternatively, the integrated circuit is built upon the inner portion of the back cover of the wrist watch. The intelligent personal safety device enables a wearer to generate distress signals during an emergency situation and communicates the distress signal to a remote server via any communication device which is in proximity to the intelligent personal safety device.

8 Claims, 2 Drawing Sheets

INTELLIGENT PERSONAL SAFETY DEVICE

CROSS REFERENCE TO RELATED APPLICATIONS

Figure 1:
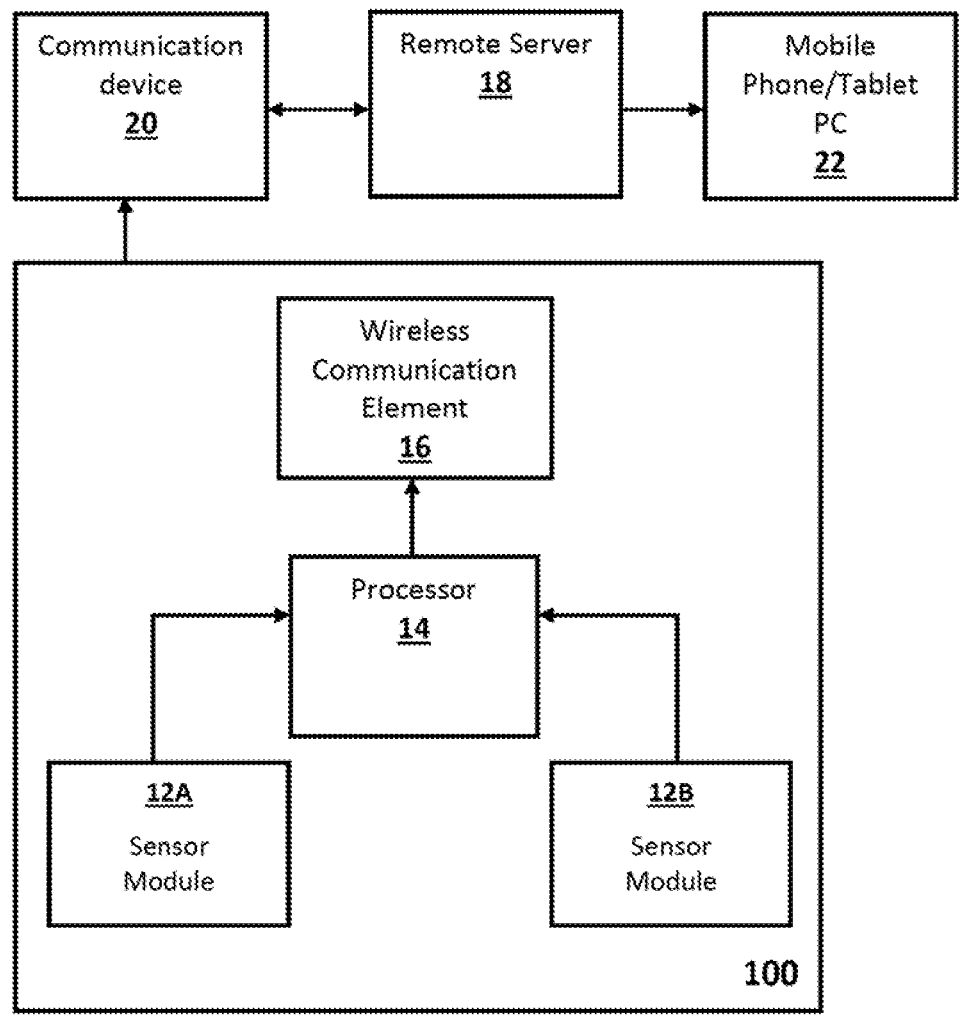

This patent application claims the priority of the Indian Provisional Patent Application No. 4282/CHE/2014 filed on 3 Sep. 2014, having the title 'SYSTEM AND METHOD FOR PROVIDING PERSONAL SAFETY THROUGH WEARABLE DEVICES', whose contents have been incorporated herein, in entirety, by the way of reference.

BACKGROUND

Technical Field

The embodiments herein relates to a personal safety device. Particularly, the embodiments herein relates to a personal safety device that can be worn by a user.

Description of Related Art

In the event of medical emergency/safety emergency or any other type of emergency when assistance is required, a person (in distress) might try to connect with healthcare professionals or law enforcement officials. Typically, a person in distress (referred to as 'distressed person' hereafter) would contact healthcare professionals/law enforcement officials by making a conventional phone call. However, in certain situations, the distressed person might not be able to place a conventional telephone call. For example, the distressed person may be suffering from a heart condition that may render him incapable of making a conventional phone call directed to the concerned authorities by the way of dialing a pre-designated number, or otherwise, the distressed person may have been under an attack, which could typically prevent him from making a conventional phone call directed to the concerned authorities. Subsequently, emergency help systems that would enable a person to ask for help with the push of a button came into being. Such emergency systems enable a distressed person to get in touch with an intermediate call center/response center which typically would gather preliminary information from the distressed person and thereafter connect the distressed person with the concerned authorities. This phenomenon might result in loss of crucial time, the loss which might be catastrophic for a person already in distress.

Certain emergency response systems are tethered, preferably using a wireless communication medium to a base unit which would enable the distressed person to get in touch with concerned authorities in case of an emergency. Typically, the emergency response system tethered to the base unit is responsive to a trigger/input from a user in distress, and the input could in the form of a button press or a predetermined gesture or any other convenient mode of communication. However, such emergency response systems are restricted by the limited communication range that they are provided with. For instance, the emergency response system would communicate with the base unit only if the base unit is within a predetermined range of the emergency response system, and if the emergency response system is beyond the operational range of the base unit, then the emergency response system would not be able to communicate with the base unit.

Further, several attempts have been previously made towards solving the disadvantages mentioned hitherto, and one such attempt has been described in a prior art U.S. Pat. No. 8,249,547 which discloses a wearable member attached to the body of the wearer and also encased with a separate mobile phone member. The wearable member included a transmitter that was configured to be actuated by a user wearing the wearable member for transmitting a message to the mobile phone member. Subsequently, the mobile phone member transmits the information/data received from the transmitter, to a remote member for further action. The disadvantage associated with the aforementioned wearable member is that it requires a GPS module which is bulky and requires to be connected all the time to a power source.

Yet another prior art European Patent Application No. 2407942 which discloses a personal security alarm system comprising a lid and a lock mechanism, with the lock mechanism operable in three modes including a detached mode, normal mode and elongated mode. The security alarm system teaches generating a 'broken bracelet alarm signal', when the lock mechanism is brought to the detached mode by use of resistance. The security alarm system generates an SMS alert to a central station and also tracks the movement and position of the lock mechanism, until the lock mechanism remains in the detached mode. The disadvantage associated with the aforementioned European patent application is that the personal security alarm system envisaged therein is a specifically designed/customized bracelet configured to function as a safety system, and that it does not involve transformation of a wrist watch into a personal safely device.

Further, US Patent Application No. 20130331058 discloses an emergency alert device adapted to be worn by a user and adapted to automatically make a cellular phone call to an emergency services center upon activation by a user. The device automatically transmits its current location—derived from GPS, via a text message to the emergency service center. U.S. Pat. No. 8,116,724 discloses a safety system comprising a plurality of wearable transceiver devices to be used with either a landline-based phone or a ceil phone to establish contact between a user of a wearable transceiver device and a central monitoring station. U.S. Pat. No. 7,015,817 discloses a wearable device worn by an individual and a portable device operatively coupled to the wearable device. The portable device is operatively coupled to a monitoring system through a wireless telephone network. The portable device transmits periodically encrypted location information as well as status information across the wireless network to the monitoring system. The monitoring system tracks the location of the individual and alerts the appropriate authorities when the individual violates a rule/precondition. The disadvantage associated with the aforementioned patent documents is that the devices envisaged therein do not communicate with the emergency service center/central monitoring station, without pairing.

Therefore, in view of the disadvantages mentioned hitherto, there was felt a need for a personal safely device that is cost effective. There was also felt a need for an add-on module that is capable of transforming a common place wrist watch into a personal safety device without necessitating significant technological modifications. There was also felt a need for a personal safety system that communicates with a remote server via a communication network accessible through a telecommunication device, without necessitating a pairing between the personal safety system and the communication system.

The abovementioned shortcomings, disadvantages and problems are addressed herein and which will be understood by reading and studying the following specification.

OBJECTS

An object of the embodiments herein is to provide a customized personal safety device.

Another object of the embodiments herein is to transform a common place wrist watch into a personal safety device.

Yet another object of the embodiments herein is to provide a personal safety device that can be removably attached to a wrist watch of any make/model.

Still a further object of the embodiments herein is to provide a personal safety device that does depend upon satellite communication for its operations.

One more object of the embodiments herein is to provide a personal safety device that is capable of transmitting a distress signal using a telecommunication network accessible via a communication device in proximity to the personal safety device.

Yet another object of the embodiments herein is to provide a personal safety device that communicates with a remote server (monitoring the personal safety device) using a telecommunication network accessible via a communication device in proximity to the personal safety device.

Another object of the embodiments herein is to provide a personal safety device that communicates with a remote server via a communication device which does not have prior access to information about the personal safety device and its wearer.

Still a further object of the embodiments herein is to provide a personal safety device that is flexible in terms of usability.

These and other objects and advantages of the embodiments herein will become readily apparent from the following detailed description taken in conjunction with the accompanying drawings.

SUMMARY

The embodiments herein envisages an apparatus that is configured to be removably attached to a wrist watch. The apparatus, when attached to the watch, transforms the wrist watch into an intelligent safety device. The apparatus enables a wearer (wearing the wrist watch) to selectively generate distress signals, which are subsequently transferred to one or more users pre-designated by the wearer. The apparatus includes at least one sensor module responsive to at least one physical phenomenon applied thereupon, the sensor module further configured to generate an alert in the event that applied physical phenomenon exceeds a predetermined threshold value.

The apparatus further includes an integrated circuit embedded therein, the integrated circuit comprising a processor communicably coupled to the sensor module, the processor configured to generate a distress signal subsequent to receiving the alert generated by the sensor module.

The integrated circuit further includes a wireless communication element that receives the distress signal from the processor and routes the distress signal through at least one communication device programmed to analyze and transmit the distress signal to a remote server. The remote server, in accordance with the embodiments herein is configured to determine the wearer to be in distress in an event that the distress signal is received, the remote server further configured to generate a message to be transmitted to users designated by the wearer, the message informing users of said communication devices about the wearer being in distress.

In accordance with the embodiments herein, the apparatus is embedded into a flexible strap, the flexible strap configured to be removably attached to the wrist watch. In accordance with another aspect of the embodiments herein, the sensor module is built into the integrated circuit, the integrated circuit configured to be incorporated into a watch case of the wrist watch. In accordance with yet another aspect of the embodiments herein, the apparatus is built upon a back cover of the wrist watch, said back cover configured to be removably attached to body of the wrist watch.

In accordance with the embodiments herein, the distress signal incorporates a set of instructions for instructing the communication device to identify and transmit the distress signal to the remote server monitoring the apparatus.

In accordance with the embodiments herein, the wireless communication element is configured to communicate with the communication device without initiating a simple/legacy pairing process.

In accordance with the embodiments herein, the remote server is configured to extract coordinates corresponding to the geographic location of the communication device transmitting the distress signal to the remote server, the remote server further configured to infer the location of the wearer to be in proximity to the communication device transmitting the distress signal.

In accordance with the embodiments herein, wherein the remote server is further configured to embed the information corresponding to the coordinates of the geographic location of the wearer, with the message prior to transmitting the message to communication device(s) pre-designated by the wearer.

These and other aspects of the embodiments herein will be better appreciated and understood when considered in conjunction with the following description and the accompanying drawings. It should be understood, however, that the following descriptions, while indicating the preferred embodiments and numerous specific details thereof are given by way of illustration and not of limitation. Many changes and modifications may be made within the scope of the embodiments herein without departing from the spirit thereof, and the embodiments herein include all such modifications.

BRIEF DESCRIPTION OF THE ACCOMPANYING DRAWINGS

Figure 2:
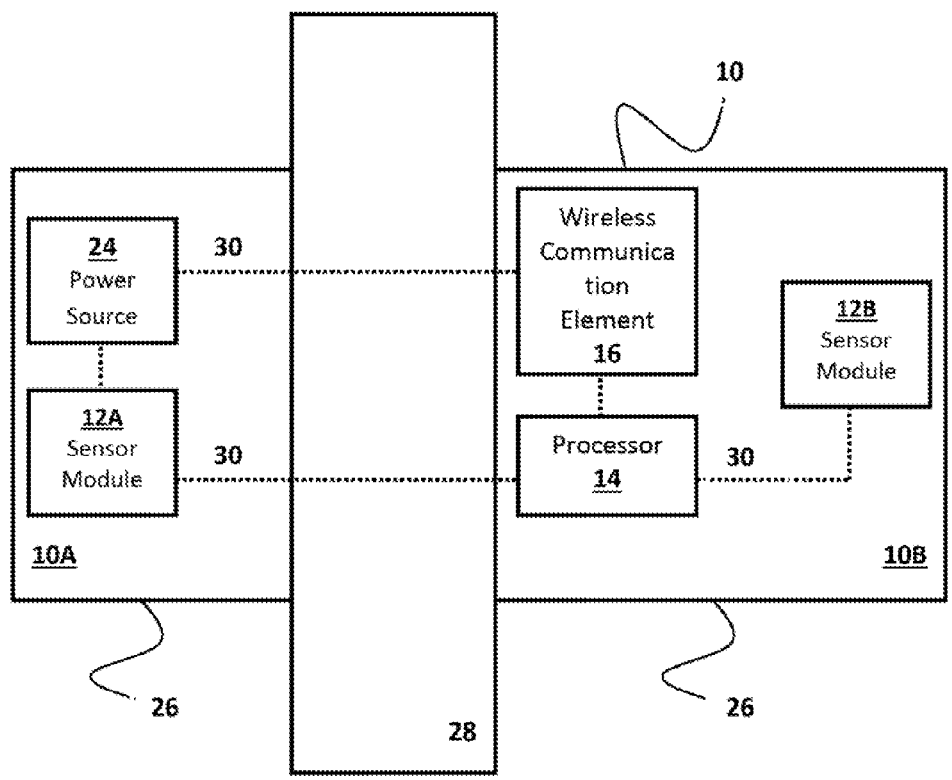

The other objects, features and advantages will be apparent to those skilled in the art from the following description and the accompanying drawings in which:

FIG. 1 is a block diagram illustrating the components of an intelligent personal safety system, according to the embodiments herein; and FIG. 2 illustrates a schematic diagram of the intelligent personal safety system embedded into the strap of a wrist watch, in accordance with the embodiments herein.

Although the specific features of the present invention are shown in some drawings and not in others. This is done for convenience only as each feature may be combined with any or all of the other features in accordance with the present invention.

DETAILED DESCRIPTION

In the following detailed description, reference is made to the accompanying drawings that form a part hereof, and in which specific embodiments of the embodiments herein shown by way of illustration. The embodiments are described in sufficient detail to enable those skilled in the art to practice said embodiments and it is to be understood that logical, mechanical and other plausible modifications could be made to the embodiments without departing from the original scope of the embodiments. The following detailed description is therefore not to be considered in a limiting sense.

The embodiments herein envisages an intelligent personal safety device which is configured to be embedded into a common place wrist watch. The wrist watch is transformed into a device that monitors the safety of the wearer, apart from performing the conventional functions that a wrist watch is designed to perform, upon addition (embedding) of the intelligent personal safety device into the wrist watch. The intelligent personal safety device, in accordance with the embodiments herein is embedded in the strap of the wrist watch. Alternatively, the personal safety device is incorporated in the back cover of the wrist watch. Alternatively, the personal safety device is incorporated in the watch case. In the aforementioned implementations, the safety watch is removably attached to the wrist watch. The personal safety device can be attached to any wrist watch irrespective of the model and make of the wrist watch.

Referring to FIG. 1, there is shown a block diagram of the apparatus 100 that transforms a wrist watch (represented by reference numeral 10 in FIG. 2). Referring to FIG. 1 again, the apparatus 100 includes a sensor module. In accordance with one embodiment herein, there are at least two sensor modules 12A and 12B located at predetermined positions of a strap (not shown in FIG. 1) of the wrist watch 10. The sensor module 12A and 12B are configured respectively, to detect application of a physical phenomenon of the strap. The physical phenomenon, for example includes application of violent physical force on the watch strap or on a hand onto which the wrist watch 10 is strapped. Physical phenomenon also includes application of pressure/acceleration on the watch strap or on a hand onto which the watch is strapped. The sensor modules 12A and 12B can be MEMS or pressure sensors or capacitive sense switches.

Subsequently, the sensor modules 12A and 12B individually determine whether the physical phenomenon exerted upon the strap exceeds a predetermined threshold. If the threshold value is determined to to be violated, the sensor modules 12A and 12B generate an alert which is preferably in the form of an electrical signal. Alternatively, a wearer wearing the intelligent personal safety device can also trigger the generation of the alert (indicative of a danger/stressful situation/medical emergency and the like) by applying physical force/pressure sufficient enough to violate the predetermined threshold value, on at least one of the sensor modules 12A and 12B. The alert generated by the sensor modules 12A and 12B is typically an electrical signal.

The alert thus generated is transferred irony the sensor modules 12A and 12B to a processor 14, which is a part of an integrated circuit (not shown in figures). The processor 14 processes the alert and subsequently generates a distress signal indicative of the wearer of the intelligent personal safety device being in distress/emergency. The processor 14 cooperates with a wireless communication element 16 (incorporated in the strap 10A as a part of the aforementioned integrated circuit), and transfers the distress signal to the wireless communication element 16.

In accordance with the embodiments herein, every intelligent personal safety device (which is subsequently embedded onto a wrist watch 10) incorporates a first identifier uniquely identifying the intelligent personal safety device, and a second identifier denoting the identity of a remote server 18 that continuously monitors each of the intelligent personal safety devices. The first identifier and second identifier are embedded into the distress signal by the processor 14, prior to transmitting the distress signal to the wireless communication element 16.

The wireless communication element 16, in accordance with the embodiments herein analyzes the first identifier and the second identifier respectively, and identifies at least one communication device 20, for example a mobile phone, within wireless communication range of the wrist watch 10. In accordance with one embodiment of the embodiments herein, the communication device 20 identified to be in the wireless communication range of the wrist watch 10 should have been specifically customized/configured to receive and process the distress signal transmitted by the wireless communication element 16.

In accordance with the embodiments herein, the communication device 20 receives the distress signal from the wireless communication element 16, and processes the received distress signal to identify at least the safety device from which the distress signal emanated (by analyzing the first identifier), and also to identify (by analyzing the second identifier) the end point (in this case, the remote server 18 monitoring the safety device) to which the distress signal is to be transmitted. Subsequently, the communication device 20 transmits the distress signal to the remote server 18 (end point) either directly or by routing the distress signal through a plurality of communication networks.

In accordance with the embodiments herein, the communication device 20 is configured to identify the first identifier comprising information corresponding to the safety device from which the distress signal emanated, and a second identifier comprising information corresponding to the remote server 18 to which the distress signal is to be transmitted. Preferably, the communication device 20 is programmed by the way of computer readable instructions to identify a distress signal embedded with the first identifier and the second identifier. The communication device 20 communicates with the wireless communication element 16 of the apparatus 100, without pairing, and solely by the way of identifying the first identifier and second identifier embedded in the distress signal emanating from the wireless communication element 16.

In accordance with the embodiments herein, the remote server 18 receives the distress signal from the communication device, and deciphers the location of the communication device 20 from which the distress signal was first transmitted. Subsequently, the remote server 18 inters the location of the wearer (of the intelligent personal safety device) to be in proximity (preferably within the communication range) to the location of the communication device 20. Subsequently, the remote server 18 generates a message, preferably an SMS indicating that the wearer wearing the intelligent personal safety device is in distress. Further, the remote server 18 is provided with access to pre-designated contact information (which includes at least the mobile phone number) corresponding to at least one person who is designated by the person wearing the intelligent personal safety device. The remote server 18 subsequently transmits the generated message to the contact numbers (for example, linked to a mobile phone/Tablet PC 22) pre-specified by the wearer.

In accordance with another embodiment of the embodiments herein, the sensor modules 12A, 12B, the processor 14, and the wireless communication element 16 are built into an integrated circuit and the said integrated circuit is built onto the back cover of the wrist watch 10. In accordance with another embodiment of the embodiments herein, the sensor modules 12A, 12B, the processor 14, and the wireless communication element 16 are built into an integrated circuit and the said integrated circuit is built into the watch case of the wrist watch 10A. The difference in arrangement/positioning of the sensor modules 12A, 12B), the processor 14, and the wireless communication element 16, would not have a bearing on the functionalities of these components.

Referring to FIG. 2, there is shown a schematic diagram of the intelligent personal safety system embedded in a strap 26 of the wrist watch 10. The strap 26 is attached to the two opposite sides of the watch dial 28. The sensor modules 12A, 12B, the processor 14, and the wireless communication element 16 are built into an integrated circuit, and the integrated circuit is embedded into the strap 26 of the wrist watch 10. Typically, a power source 24 that powers the integrated circuit is placed on a first part 10A of the strap 26, with the integrated circuit being placed on the second part 10B of the strap 26. The first part 10A and the second part 10B of the strap 26 remain disconnected when the wrist watch 10 is not worn by the wearer.

The first part 10A and second part 10B of the strap are interconnected by a buckle (not shown in figures). The first part 10A of the strap includes the integrated circuit and the second part 10B of strap includes the power source. The integrated circuit and the power source are connected using a conductive ink 30. As the first part 10A and second part 10B of strap 26 remain disconnected from one another, the power source 24 is not connected to the integrated circuit and therefore no electricity is drawn from the power source 24. When the wearer wears the wrist watch 10, the first part 10A and the second part 10B of the strap 26 are connected. This phenomenon enables the integrated circuit to draw electricity from the power source 24, for the purposes of generating distress signal in the event that a physical phenomenon exceeding a predetermined threshold value is experienced by at least one of the sensor modules 12A and 12B. Subsequently, no electricity is drawn from the power source when the first part 10A of the strap 26 and the second part 10B of the strap 26 are disconnected, i.e., when the wrist watch 10 is not worn by the wearer.

The technical advantages of the embodiments herein include the realization of an intelligent personal safety device that can be embedded/built upon a common place wrist watch. The safety device is configured to be embedded in the strap of a wrist watch. Alternatively, the safety device is built into the back cover of the wrist watch. Alternatively, the circuitry for the personal safety device is built into the circuitry of the wrist watch. The personal safety device is configured to be removably attached to a wrist watch of any make/model. The personal safety device does depend upon satellite communication for its operations, but communicates a distress signal (which is initially generated by a user of the safety device indicating a distress), to a central server by routing the distress signal through any third party communication device which is in the communication range of the safety device.

I claim:

1. An apparatus removably attached to a wrist watch, said apparatus comprising:
    at least one sensor module, said sensor module responsive to at least one physical phenomenon applied thereupon, said sensor module further configured to generate an alert in the event that applied physical phenomenon exceeds a predetermined threshold value;
    an integrated circuit embedded therein, said integrated circuit comprising:
        a processor communicably coupled to said sensor module, said processor configured to generate a distress signal subsequent to receiving the alert generated by said sensor module;
        a wireless communication element cooperating with said processor to receive said distress signal, said wireless communication element further configured to route said distress signal through at least one communication device programmed to analyze and transmit the distress signal, to a remote server, wherein said wireless communication element is configured to route said distress signal through at least one communication device, without pairing with said communication device;
        said remote server configured to determine the wearer to be in distress, and generate a message to be transmitted to at least one user pre-designated by the wearer, said message informing said user about the wearer being in distress;
    said apparatus transforming said wrist watch into an intelligent safety device upon attachment thereto.

2. The apparatus as claimed in claim 1, wherein said apparatus is embedded into a flexible strap, said flexible strap configured to be removably attached to the wrist watch.

3. The apparatus as claimed in claim 1, wherein said sensor module is built into said integrated circuit, said integrated circuit configured to be incorporated into a watch case of the wrist watch.

4. The apparatus as claimed in claim 1, wherein said apparatus is built upon a back cover of the wrist watch, said back. cover configured to be removably attached to body of the wrist watch.

5. The apparatus as claimed in claim 1, wherein said distress signal incorporates a set of instructions for instructing said communication device to identify and transmit said distress signal to the remote server monitoring the apparatus.

6. The remote server as claimed in claim 1, wherein said remote server is configured to extract coordinates corresponding to the geographic location of the communication device transmitting the distress signal to the remote server, said remote server further configured to infer the location of the wearer to be in proximity to the communication device transmitting the distress signal.

7. The remote server as claimed in claim 1 or 6, wherein said remote server is further configured to embed the information corresponding to the coordinates of the geographic location of the wearer, with said message prior to transmitting said message to communication device(s) pre-designated by the wearer.

8. The sensor module as claimed in claim 1, wherein said sensor module is configured to be responsive to the physical phenomenon selected from a group consisting of force, pressure, acceleration, frequency and friction.

* * * * *